United States Patent
Edelman et al.

(10) Patent No.: US 10,086,275 B2
(45) Date of Patent: Oct. 2, 2018

(54) SYSTEMS AND METHODS FOR MASS USER MULTI INPUT CONTROL OF A COMMON DISPLAY

(71) Applicant: Colossi LLC, Walnut, CA (US)

(72) Inventors: Bryan Edelman, St. Louis, MO (US); Benjamin Skaggs, Lucas, TX (US); James E. Tanner, Los Angeles, CA (US)

(73) Assignee: Colossi LLC, Walnut, CA (US)

( * ) Notice: Subject to any disclaimer, the term of this patent is extended or adjusted under 35 U.S.C. 154(b) by 59 days.

(21) Appl. No.: 15/165,454

(22) Filed: May 26, 2016

(65) Prior Publication Data

US 2016/0346684 A1 Dec. 1, 2016

Related U.S. Application Data

(60) Provisional application No. 62/168,407, filed on May 29, 2015.

(51) Int. Cl.
| | |
|---|---|
| *G06F 17/00* | (2006.01) |
| *A63F 13/26* | (2014.01) |
| *A63F 13/92* | (2014.01) |
| *A63F 13/352* | (2014.01) |
| *A63F 13/27* | (2014.01) |
| *H04M 1/725* | (2006.01) |

(52) U.S. Cl.
CPC ............... *A63F 13/26* (2014.09); *A63F 13/27* (2014.09); *A63F 13/352* (2014.09); *A63F 13/92* (2014.09); *H04M 1/72544* (2013.01)

(58) Field of Classification Search
None
See application file for complete search history.

(56) References Cited

U.S. PATENT DOCUMENTS

| | | | |
|---|---|---|---|
| 8,864,566 B2 | 10/2014 | Snoddy et al. | |
| 8,951,124 B2 | 2/2015 | Hussman et al. | |
| 2014/0296918 A1* | 10/2014 | Fening | A61B 17/7016 606/258 |
| 2014/0354160 A1* | 12/2014 | Aggarwal | H05B 37/0227 315/152 |
| 2017/0309120 A1* | 10/2017 | Frenkel | G07F 17/3225 |

OTHER PUBLICATIONS

Edelman, Bryan, "GETOGETHER," A Thesis Presented to the Faculty of the USC School of Cinematic Arts University of Southern California, published Apr. 9, 2015, 14 pages.

* cited by examiner

*Primary Examiner* — Ronald Laneau
(74) *Attorney, Agent, or Firm* — Lewis Rice LLC

(57) ABSTRACT

Systems and methods which provide for quick to setup and play multi-player activities or games which can be used with a group of people to provide for an interactive experience. The games require no advance software download and the systems and methods are designed to handle a large number of players going through the steps of signing in and playing in a very short window of time. As such, they are very useful to provide for interactive experiences in breaks of activity at a large venue such as a sports arena or concert hall.

20 Claims, 5 Drawing Sheets

SYSTEMS AND METHODS FOR MASS USER MULTI INPUT CONTROL OF A COMMON DISPLAY

CROSS REFERENCE TO RELATED APPLICATION(S)

This application claims the benefit of U.S. Provisional Patent Application Ser. No. 62/168,407, filed May 29, 2015, the entire disclosure of which is herein incorporated by reference.

BACKGROUND OF THE INVENTION

1. Field of the Invention

This disclosure is related to the field of electronic gaming. Particularly to games or other systems wherein a large number of instructions from a large number of discrete input devices can be collated to control the output of a single common display in real-time.

2. Description of the Related Art

Human beings generally enjoy each other's company and often express that enjoyment through the joint participation and experiencing of shared events. Cities are riddled with venues, such as stadiums, where a large crowd of people can join together to share in a common experience be it a musical concert, performance art event, sporting event, religious service, culinary sampling, civic gathering, or other collective event. These events provide humanity with a common denominator and have been around since ancient times. There are huge numbers of well-known historical venues catering to these types of activities including the Coliseum and Globe Theatre.

Originally, to participate in these events, one had to be at the event and in the venue. However, the advent of electronic mass communication, and particularly the progression from radio, television, the Internet, and then Internet capable mobile devices, has made these events more universal and more accessible. Where it used to be that to share in the event one had to be in the venue, with radio and television, one could now witness the event without necessarily being there, but couldn't communicate readily with those at the event. However, the Internet, and more specifically Internet capable mobile devices, has allowed tot those both at and separated from the venue to interact and share, generally in near real time, in the event with friends that are both at the venue and away from it.

This interconnectivity of involvement with events that one is physically spaced from has really only really arisen with the advent of the "smartphone" and related mobile technology which utilizes packet data communication over wireless networks on devices which are transportable wherever a person goes. As opposed to telephony, which were single origin to destination devices, the advent of the Internet, and social networking systems such as Facebook, Twitter, Instagram, Meerkat, Snapchat, and Lockerdome combined with wireless interconnectivity has allowed humanity to communicate our thoughts, feelings, and impressions, in text, photo, or video to friends across the globe near instantaneously and without regards for who, or how many, are on the receiving end of the communication. Thus, we can be corresponding to friends who are at the venue while we watch the event on television from our home and vice-versa. This communication is also much like communication with a person who we are actually physically near at the venue as we are not monopolizing their attention (as can be the case with a telephone call) but can be one of many communications they are switching rapidly between.

While the ability to upload and share events in our lives has led to increasing connectivity between friends and those of even minimal common interest, it has also led to increased isolation. Instead of talking with those we are sitting next to at the ballpark or outdoor concert series, we are staring at device screens and speaking with our thumbs. As some commenters would contend, we have traded in actual human interaction for the virtual, and that has actually led to isolation.

This is emphasized by the fact that in addition to our networking with other humans going virtual, much of our interaction with even live events is going virtual. It has become increasingly common for even those who are at a sporting or similar event, to be simultaneously watching the event live and on a device to obtain additional commentary, perspectives, and content. It is also common to be at an event and see people with good seats, with a good view of the live action, watching it on the large television screens in the venue because that is the image they are more used to seeing and it often still provides more content. Further, a number of recent studies have shown drastic increases in what is sometimes called "dual screening" where a person is actually interacting with two different digital streams (for example a television and a social network feed), in conjunction with the same event, at the same time.

This crossing over where interaction with digital devices is becoming increasingly not just as an activity in and of itself, but part of other activities or as a replacement for what used to be in person interactions is starting to permeate the public consciousness. Increasingly, we are seeing digital devices gather information from us and use it to shape our interactions and understanding of our environment. A person's actions and movements can be used to drive other events. Posting certain items to social media or taking a certain number of steps during the day can generate bonuses in virtual environments. The dividing line between an interaction in person, and an interaction virtually is now becoming blurred.

Even our sporting events are becoming more virtual. Video games, which used to involve a single player competing against an intelligence engine on their machine in what was essentially a preprogrammed puzzle, are increasingly multi-player where individual players are provided with both human opponents and human teammates. Further, there has been increasing interest in spectating such games with Internet based video channels arising that are focused on displaying such games. In many respects, video games have now taken a space that was originally occupied almost exclusively by sporting events and provided a virtual alternative.

Typically, in a single-player game, the player controls the actions of a single game element. This game element is often called an "avatar" and is designed to represent the player in the game world. In some games, the avatar is visible to the player and can be seen in the virtual world (a so called "third-person view" used in games such as Diablo™) while in others the avatar is not shown, but the image the avatar would see, along with certain game control elements such as indication of what is in the person's hands, or the speedometer of a vehicle, are visible (so-called "first-person view" used in games such as Doom™ and many racing games).

Regardless of the type of view used, all the remaining elements in the game are controlled by the video game programming. Generally, this meant they moved in accordance with a variety of preselected algorithms and intelligent engines that were selected based on the difficulty level of competition the user selected. Single player games can be a lot of fun, but can become repetitive. The computer control can be formulaic (for example the fixed pattern that the ghosts in Pac Man™ follow) and players could find was to easily defeat the computer by simply abusing certain elements of the algorithms. Even without specifically finding a loophole in the programming, a player would often get sufficiently good at a game (by simply knowing what to expect) that the computer no longer offers much of a challenge.

The difference between most one player video games and the real-life activities they are simulating is generally two-fold. In the first instance, you are always a team of one in a single player game. Other game elements, including opponents and teammates, are computer controlled and, as such, their behaviors are limited. While the programming could be very good and could provide for a challenging game, these systems lacked the randomness that is often introduced by real world competition. They are more akin to a puzzle than a team sport. A second problem was that the game often lacked consequences. Ultimately, when a player failed to save the world, they simply started over.

To try and deal with the first issues of single player games, games started to provide for multi-player experiences. In these systems, instead of other elements being controlled by algorithms, they are controlled by the actions of another player. The computer system then serves to make sure that the actions of each player in controlling an element are correctly presented to the other player as that element's actions. For example, the position of the element controlled by the first player is visible in the display of the second player (or not) based on where the first player's avatar is located on the virtual playing field. Thus, the behaviors of elements are no longer limited to algorithmic controls and the random elements of human control, as well as actual differences between human skill levels, are introduced to the game.

As much as multi-player video games may have changed from the original hard wired coin-operated arcade machines to the massively multiplayer games (e.g. MMORPGs) on the Internet today, very little about how they are played has changed. In multi-player video games, each player needs to have a display that shows them (via third-person or first-person view) what the avatar (element) they control is doing, what it can see, what it can interact with, and what effect those interactions have. Based on what a player sees on their display, they control the movement and actions of that avatar to interact with the other elements regardless of if they are computer controlled, environmental, or avatars of other players.

Because of the way multi-player games work, the game play often resembles the game play of a traditional sport with each player seeing their individual view of the playing field, which also includes viewing the elements controlled by other players, and taking actions based on what they see. Also like a team sport, it is possible to spectate or to coach the sport by taking an overall view from an elevated viewing position where the user can take in the whole field. In the video game situation, the field is simply a virtual creation with all the avatars positioned and acting on it.

Much of the reason multi-player games have gotten more common has to do with the increases available in computing power, and particularly network speed. Multi-player games require very fast network connections and fast processors for each of the players. The individual processor for each player has to provide their view of the playing field (and all associated graphic requirements), stored imagery of their avatar for example their appearance and what they may have in their hands), specifics of the character's avatar (for example their current health rating) and other local controls which are part of a single player game. The local processor also has to receive an indication of the actions of the other avatars, and update the display of the local player so that the player can correctly act. Further, the player's actions also need to be sent to the central host quickly so that they can be passed on to the other players so that they can correctly react. All of this also generally has to be performed in real-time and, as should be apparent, requires a substantial amount of communication and processing to carry out.

To deal with processing requirements, these games typically require the individual player to download game software to their system, which will provide for the core of the display controls as well as interpreting a user's actions, and will simply take in from a central server information related to the actions of others so that it can provide an appropriate image for this player of the other player's action. Further, the games only function well when all the players have suitably fast network connections and processors in their machines to make sure that there is little to no lag between them. Thus, multiplayer games often require high powered computers, specifically uploaded with large amounts of software and having a high-speed landline data connection to play multi-player games effectively.

To play the game, a player will commonly startup their local software copy of the game, which loads all the various necessary code into faster memory in their system as well as loading up specifics of their avatar, and then connect with a central server. The central server will get all the initial information from their local machine, and once the server has everything it needs, it will put their avatar in the game. This type of arrangement allows for the player's actions to dominate the network traffic being sent and offload the graphic and display requirements for each player to their individual processors. However, it also means that a substantial amount of setup is required for games to be played. Downloading the core game program and getting it installed and working on an individual machine often takes multiple minutes. Further, even for players that have played repeatedly, getting the system to log them into the game is often a relatively long process requiring the player to wait a noticeable amount of time. Further, if a player has a substantial amount of local network traffic slowing down their connection, they often have to wait longer to get connected and can see gameplay suffer because they are not getting updates fast enough.

What all the above means is that multi-player games are a lot of fun, but also require a lot of setup, they have not been useable for situations where the game needs to be announced and played in a relatively confined period of time.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, described herein are systems and methods which provide for quick to setup and play multi-player activities or games which can be used with a group of people to provide for an interactive experience. The games require no advance software download and the systems and methods are designed to handle a large number of players going through the steps of signing in and playing in a very short window of time. As such, they are very useful to provide for interactive experiences in breaks of activity at a large venue such as a sports arena or concert hall.

There is described herein, among other things, a multi-player user activity system comprising: a venue having a central display visible to a plurality of users, each of said plurality of users having a mobile device; a host server controlling said central display; a plurality of worker servers in communication with said host server; and an usher server for connecting a subset of said mobile devices to each of said worker servers; wherein, said central display provides an indication of how to make a connection using said mobile device; wherein said connection connects said mobile device to said usher server; wherein said usher server connects said mobile device to one of said worker servers; wherein each said mobile device provides an instruction to said connected worker server; wherein said connected worker server collects said instructions from said connected mobile devices and provides said instructions to said host server; wherein said host server alters said display based on said instructions; and wherein neither said host server nor said worker server sends instructions to said mobile device to alter a display on said mobile device.

In an embodiment of the system, the venue is a sports arena.

In an embodiment of the system, the venue is a concert hall.

In an embodiment of the system, the mobile device is a smartphone.

In an embodiment of the system, the display provides a game being played by said users, and said display includes an avatar.

In an embodiment of the system, the display includes a plurality of avatars, and said plurality of avatars is less than said plurality of users.

In an embodiment of the system, the mobile devices are separated into two or more opposing teams.

In an embodiment of the system, the mobile device includes a secondary display which changes solely on user input to said mobile device while said mobile device is communicating to said worker server.

In an embodiment of the system, the mobile device includes a secondary display which is static while said mobile device is communicating to said worker server.

There is also described herein a method of providing a multi-player user activity, the method comprising: providing a venue having a central display visible to a plurality of users, each of said plurality of users having a mobile device; having said central display provide an indication of how to make a connection using said mobile device; connecting said mobile device to an usher server; said usher server connecting said mobile device to a worker server; each of said mobile devices providing an instruction to said connected worker server; said connected worker server collecting said instructions from said connected mobile devices and providing said instructions to said host server; said host server altering said display based on said instructions; and neither said host server nor said worker server sending instructions to said mobile device to alter a display on said mobile device.

In an embodiment of the method, the venue is a sports arena.

In an embodiment of the method, the venue is a concert hall.

In an embodiment of the method, the mobile device is a smartphone.

In an embodiment of the method, the display provides a game being played by said users, said display including an avatar.

In an embodiment of the method, the display includes a plurality of avatars, and said plurality of avatars is less than said plurality of users.

In an embodiment of the method, the mobile devices are separated into two or more opposing teams.

In an embodiment, the method further comprises changing a secondary display on each of said mobile devices, said changing occurring based solely on user input to said mobile device while said mobile device is communicating to said worker server.

In an embodiment of the method, the mobile device includes a secondary display which is static while said mobile device is communicating to said worker server.

DETAILED DESCRIPTION OF THE PREFERRED EMBODIMENT(S)

Figure 1:
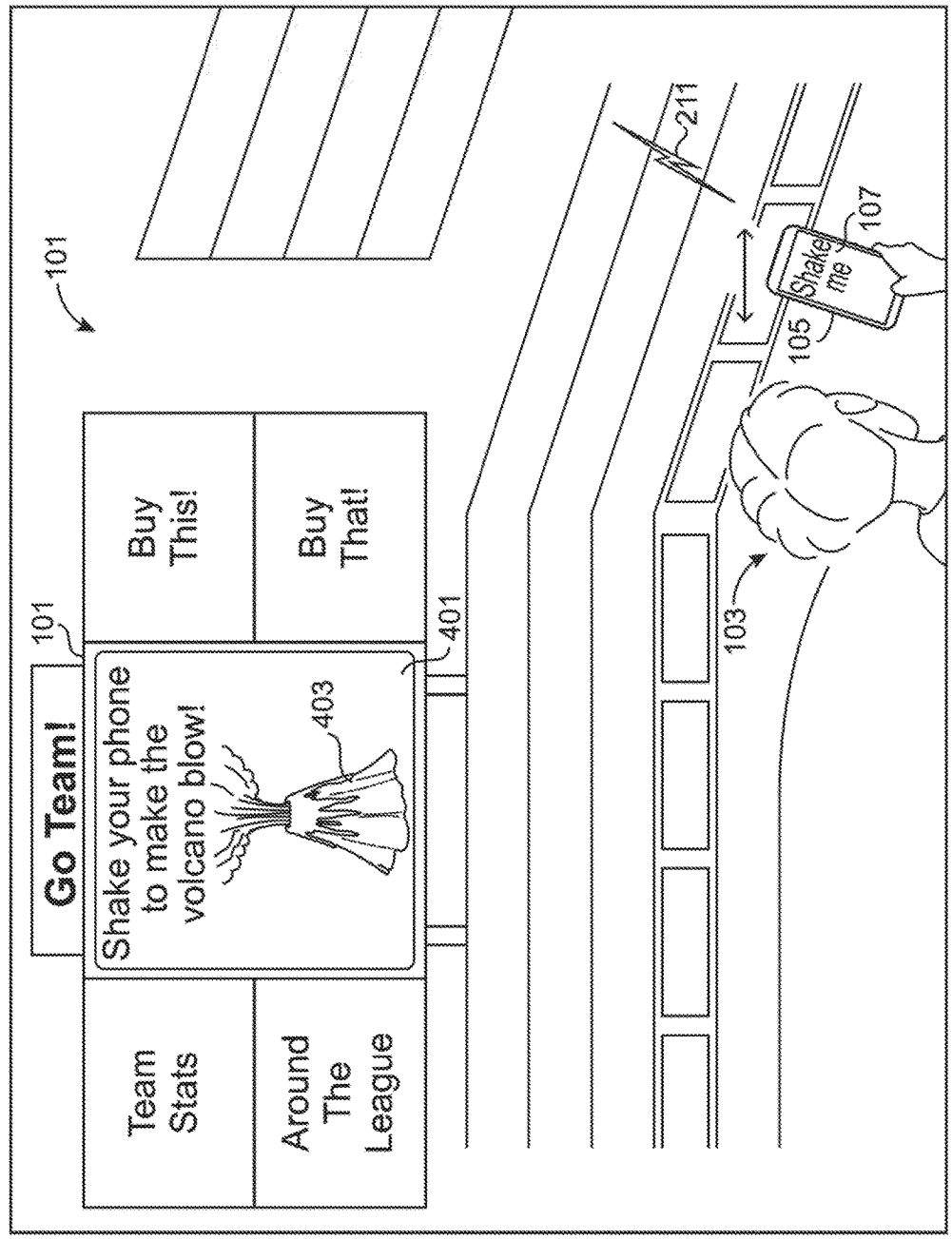
FIG. 1 depicts an embodiment of a central display in a sporting venue showing common control for a plurality of users.

Much of the reason that digital data is becoming so pervasive in our lives is because it now can move with us. Thirty years ago, a person was lucky to have the ability to make a phone call from their car, whereas now they can surf the internet from a hiking trail. The primary source of this increasing interconnectivity is the mobile device or so called "smartphone." These devices are effectively powerful general purpose computers which can now operate, and be interconnected with other computers and devices, in virtually any location. Further, it is increasingly becoming the case that these devices are not only available to us, but we carry them wherever we go.

This ready accessibility to digital mobile devices, in addition to increasing our connectivity, also provides a new opportunity to develop interactive events of a type that have not previously been contemplated. Specifically, mobile devices can now be used to provide for community activities. People now have access to digital information regardless of where they are and can type to communicate as readily as they can talk. At the same time, that access is, in many respects, also defined by where they are. Thus, the mobile device can now grant us access and input into a digital environment at a common venue.

The systems and methods contemplated herein are not traditional multi-player video games. Multi-player video games are designed to allow for each player to play their own game and have their actions in their game provide for interactions with other players and they require substantial setup. Instead, the multi-player game activities discussed herein are designed to provide for an interactive experience with minimal setup and with a large number of ad-hoc participants.

Mobile devices generally have much more limited memory and less powerful processors than desktop computers. Further, in areas where there is a large concentration of people, each person's mobile device is generally competing with all the other devices for limited bandwidth due to them having to utilize wireless connections. It is well known that at concerts, sporting events, and other places with large numbers of people, network connections on mobile devices will often operate very slowly (if they work at all) and it is near impossible to play a multi-player game in the traditional sense.

Generally, the system and methods discussed herein are for use in conjunction with large events where there is a gathering of a significant number of people. This can be, but is not limited to, attendees at a sporting event, concert, art exhibition, museum, park, festival or other event, hut this is not required. The systems and methods are used to generate quick ad-hoc activities, which are often in the form of competitive games but do not need to be, where all the participants at the venue can participate, without having to go through a lengthy setup process or having to have a particularly robust network connection.

The systems and methods do this, in the first instance, by eliminating the need for each player to have their own avatar and to have a screen view specific to their avatar. Instead, each player's device is treated solely as an input mechanism for an avatar that is controlled by multiple players and displayed on a centrally viewable display. Thus, the systems and methods aggregate the output of multiple controllers (and multiple players) into a reduced number of avatars whose actions are shown only on a central display which is visible, to all participants because the participants are physically at the venue. In this way, there is only the need for one processor to handle major graphics requirements and other computationally intense processes.

Secondly, the systems and methods discussed herein are designed to streamline the startup or "logging-in" process by not requiring participants to download any software (at least in the traditional sense) to interact with the game host. This allows for players to join the game very quickly and allows the game to take place in a very short window of time even if the players have no advance warning that the game will occur. These two elements of the game experience allow for the games to be played at large venues when breaks in a principal activity occur. This can be, for example, between acts at a music venue, during a time-out in a sporting event, or during any other break in activity where there is a desire to provide an alternative activity to those at the venue.

As shown in FIG. 1, at many of these types of event venues (10) there will often be a centralized digital display (401) for providing information to those (103) gathered in the audience. In an embodiment, this can be the scoreboard (e.g. Jumbotron™) display, video screen (101), or similar object which is used to provide scoring information as well as provide replays, detail views, and even separate entertainment events during times when the live event may be on hold. For example, it is common to provide audience participation games where a single member of the audience is shown on the screen (101) playing a game between innings in a baseball game or during commercial breaks in a football game. It can also include elements such as the infamous "kiss cams" trying to get certain audience members to kiss each other for the enjoyment of the remaining fans. They can also be used with closed circuit TV cameras to provide alternative images of the event to what a participant may be able to see from their seats and prerecorded content.

Games and participatory events on these central displays, however, have generally been passive spectator events for all but a very few number of fans that participate. A user (103) may play because they have been selected to play for everyone else, may play privately with only those in their immediate vicinity knowing how they did, or may watch the particular user or users selected from the crowd. However, they cannot readily participate as part of a multi-user experience. Even in highly participatory events, only a few hundreds of often tens of thousands of spectators at avenue generally get to participate with each other.

The systems and methods herein serve to provide for an interactive game whereby the attendees (103) of the event can interact in a communal way with this single electronic display (401) through the use of their individual control devices (105). In particular, through mobile devices such as, but not limited to, their smartphones which act as control devices (105). This is done by utilizing the central display as the only display of game information, and in utilizing the user's mobile devices solely as a plurality of input devices (105) for a more limited number of avatars on the central display (401).

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wrist wear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to network hardware, print servers, file servers, NAS and SAN, load balancers, and any other hardware capable of interacting with the systems and methods described herein in the matter of a conventional "computer."

For purposes of this disclosure, there will also be significant discussion of a special type of computer referred to as a "mobile device". A mobile device may be, but is not limited to, a smart phone, tablet PC, e-reader, or any other type of mobile computer. Generally speaking, the mobile device is network-enabled and communicating with a server system providing services over a telecommunication or other infrastructure network. A mobile device is essentially a mobile computer, but one which is commonly not associated with any particular location, is also commonly carried on a user's person, and usually is in near-constant communication with a network. Mobile devices also include wearable computers, including specialized computers, such as, but not limited to, watch computers (such as the Apple™ Watch), fitness trackers (such as a Fitbit™), interactive eyewear (such as Google™ Glass), smart clothing, and related items.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto as microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory." may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g. "a remote host"), or may, in verb form, refer to a server providing a service over a network ("hosts a website"), or an access point for a service over a network.

Throughout this disclosure, the term "real-time" generally refers to software performance and/or response time within operational deadlines that are effectively generally contemporaneous with a reference event in the ordinary user perception of the passage of time fir a particular operational context. Those of ordinary skill in the art understand that "real-time" does not necessarily mean a system performs or responds immediately or instantaneously. For example, those having ordinary skill in the art understand that, where the operational context is a graphical user interface, "real-time" normally implies a response time of about one second of actual time for at least some manner of response from the system, with milliseconds or microseconds being preferable. However, those having ordinary skill in the art also understand that, under other operational, contexts, a system operating in "real-time" may exhibit delays longer than one second, such as where network operations are involved which may include multiple devices and/or additional processing on a particular device or between devices, or multiple point-to-point round-trips for data exchange among devices. Those of ordinary skill in the art will further understand the distinction between "real-time" performance by a computer system as compared to "real-time" performance by a human or plurality of humans. Performance of certain methods or functions in real-time may be impossible for a human, but possible for a computer. Even where a human or plurality of humans could eventually produce the same or similar output as a computerized system, the amount of time required would render the output worthless or irrelevant because the time required is longer than how long a consumer of the output would wait for the output, or because the number and/or complexity of the calculations, the commercial value of the output would be exceeded by the cost of producing it.

The embodiment of FIG. 1 can be used to illustrate how an individual (103) using their own mobile device (105) can interact with a common display (401). Generally, a large central screen (101) will have placed thereon a display (401) indicating that there is to be an interactive event, such as a game, occur. The screen (101) may previously have indicated that the event would occur and encourage accessing an application. Internet location, or other access to a host server (301) to allow a player (103) to participate. However, the systems and methods described herein generally do not require the user to download software to their mobile device (105) in the traditional sense, but utilize an open network connection and software such as, but not limited to, JavaScript™ and a web browser, to provide for ad-hoc activity setup. That is, in mobile device terminology, the user would not have to install a specific app to participate, they would simply need to access the host computer and receive any software necessary for their mobile device (105) to participate at that time using infrastructure software of their mobile device (105) such as their web browser. Further, any information sent to their mobile device (105) would generally be held in temporary memory and removed once the event is completed. Further, the network connection utilized by the mobile device (105) will generally be any publically available network that they can use. That is, the systems and methods do not require proprietary or private hardware or software to allow for access by each user's mobile device (105). Thus, the system will generally not include any specific need to utilize specific routers or other hardware infrastructure to access the servers. Instead, the servers will be access via the Internet or via any other publically available network using any form of, generally wireless, communication.

In an alternative embodiment, players (103) may have been encouraged to download software necessary (e.g. an app) through other means such as by push messaging to their mobile devices (105) based on upon their presence in the venue, or more traditional advertising methods such as posters and banners at the venue. This can potentially provide for a more feature rich game experience, but can limit participation and is therefore not preferred. In a preferred embodiment, players are not required to download and install any software in advance of playing the game, but are instead allowed to connect their device as a controller to the game in an ad-hoc fashion in real-time or near real-time so that virtually every person in the venue can participate regardless of their being aware that the event would occur.

Figure 8:
FIG. 8 shows a team selection screen that may be provided to a player's mobile device to allow them to select their team.

When the game is set to begin, the screen (101) will generally display a game field (401) having at least one avatar (403). This may be a single avatar upon which the attendees will cooperatively act as is shown in FIG. 1, or multiple avatars (403A) and (403B) may be presented as is shown in the embodiments of FIGS. 4-7. These avatars (403) may correspond to multiple factions within the game. For example, two tilt mazes (FIG. 4), two chase icons (FIGS. 5 and 7), or two basketball players (FIG. 6) may be provided each of which is displayed with the colors or logos of one the two teams participating in the associated sporting event. FIG. 8 shows how the colors and logos can be provided to a user to allow team selection if teams were selected by players. In an embodiment, they could simply be assigned to avoid the need for players to pick a team and potentially unbalance the game.

Upon cue from the large central screen (101), users (103) which are in the audience of the event will be cued to contact a particular Internet or other network address to play. This may be using any protocol or connection method known now or later discovered and will typically be using a standard web browser or other piece of software that is essentially ubiquitous and comes as infrastructure software on mobile devices. As discussed in more detail in conjunction with FIG. 2A, upon contacting this address, the mobile device (105) will be added as a participant to the game.

A second screen display (107) may be presented on the mobile device (105) of each user (103) that has opened the application (107) and is therefore choosing to participate in the game. The display (107) on the mobile device (105) may be the same display as appears on the central screen (101), or may be a different display. In a preferred embodiment, the display (107) is different from the display (401) and instead of showing any form of game interaction, it will instead display instructions for how to interact with the game or simple feedback mechanisms for illustrating that the player is interacting with their device. For example, using the embodiment of FIG. 4 as the game, the mobile device (105) screen (107) may indicate to tilt your device to tilt the maze (403A) or (403B) to roll the "ball" (503) through it.

It is important to recognize that the second screen display (107) is generally not a display of the video game matter in the same fashion as a multi player game. In a multi-player game, the player interacts with their individual device based on what they see on their individual screen. A large central screen is designed solely for spectating the actions of players, or to provide an overview of actions. In the present systems and methods, the second screen display (107) is simply to provide feedback to the user that they have provided input to the game, or how to provide input to the game.

The second screen display (107) is generally only used because of the specific nature of mobile devices (105) currently. Current mobile devices (105) are generally built around a touchscreen input device which is highly flexible and provides the vast majority of all interactions with the user. While many current mobile devices (105) may have a small number of additional buttons (often one general button plus small buttons for things such as volume controls), the input of a current mobile device and its display are essentially one in the same. For example, tapping an icon on a touchscreen corresponding to opening an app does not require the display of the icon to open the app. Instead, the display simply tells the user where to tap to open that particular piece of software. Thus, while the display is helpful for the user in that it provides feedback on the operation of the device, it is technically unnecessary for the instruction to be received.

The current systems and methods, as opposed to traditional multi-player video games do not provide a display on the individual user's device which is intended to provide a user with an understanding, of what is happening to their avatar in the game. Instead, the second screen display (107) is intended to provide instruction as to how the mobile device is used as a controller for this game since a touch screen, as opposed to a mechanical controller such as joystick, essentially has an infinite number of different types of input it may take in. It would be recognized by one of ordinary skill in the art that the second display (107) could be readily eliminated if an alternative method of feedback for the players input action as provided. For example, if the mobile device was a wireless joystick or a traditional multi-button video game controller, no display would be required as these systems provide tactile feedback indicating when activities have been perforated with them. Similarly, if the device was a step counting device for example, the user would have no need of a feedback mechanism to know they are physically walking or running in place.

Generally, the input to the mobile device (105) in embodiments of the present systems and methods will be physical and gestural. This is as opposed to a textual, spoken, or other "intelligent" input. As most modern mobile devices (105) do nm include mechanical keyboards (they utilize virtual keyboards that appear on their display) entering of traditional communication media can be difficult. For example, having a player type "home" and then push send repeatedly is a complicated task requiring 5 separate keystrokes, each of which must accurately be completed to make a single game input. Further, touch screen size on a mobile device requires typing with one's thumbs, which is often much slower than typing on a full size keyboard. Further, since mobile devices typically also lack traditional input devices, such as video game buttons and joysticks, they can't obtain information from those.

Instead, the system seeks to provide for a very simple command which can be carried out quickly and efficiently using the mobile device (105) to provide each game input. This will commonly be gestural and may utilize quick interactions with a mobile device (105) touchscreen (e.g. taps or swipes) or may utilize onboard electronics to detect motion of the mobile device (105) itself (e.g. the accelerometer or gyroscope to detect directions of motion, position, shaking, tilting, etc.).

Once the game begins, the players (103) can make the gestural input with their device (105) quickly and easily. Each of these gestural inputs will generally produce a single item of game information referred to herein as an "instruction". An instruction is a single piece of data used by a server (201) or (301) which is processing the game output to determine what instruction has been requested by the particular user (103). This can be as simple as a basic identifier of which avatar (403) to move a fixed amount, or a complicated input such as how far and in what directions a certain mobile device (105) is being tilted.

Figure 2A:
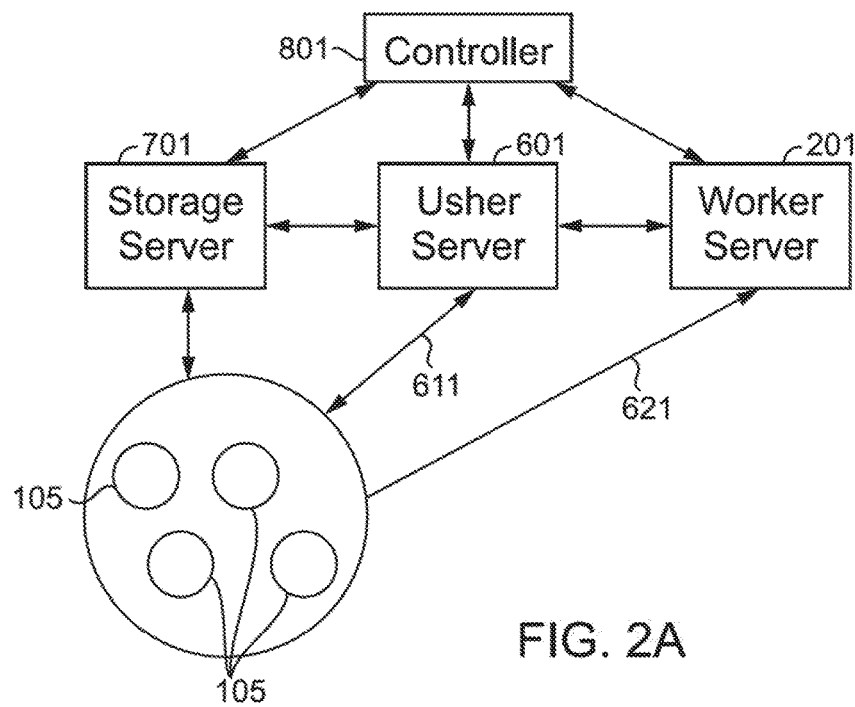
FIG. 2A shows a block diagram of an embodiment of a computer arrangement for player setup.
Figure 2B:
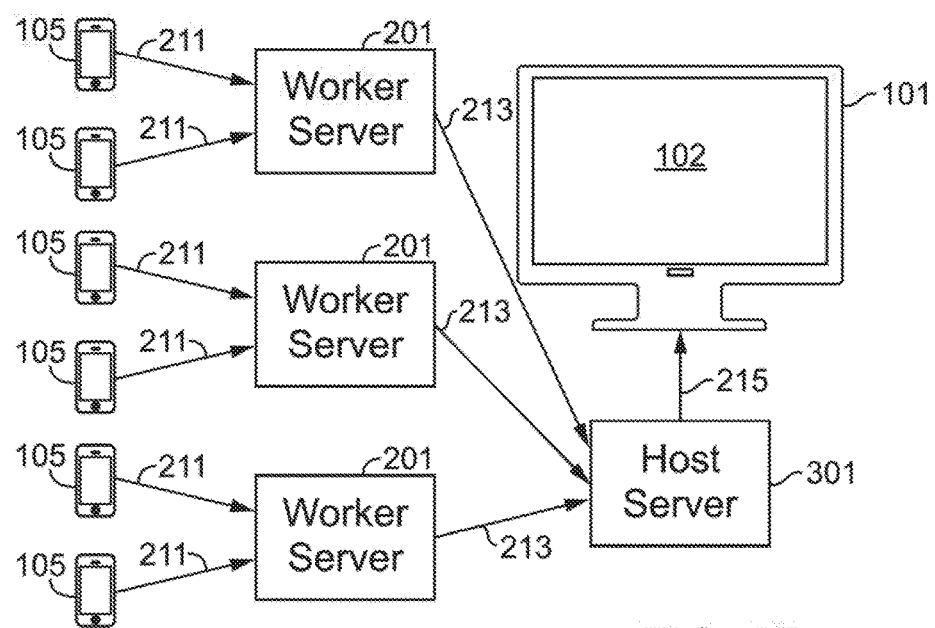
FIG. 2B shows a block diagram of an embodiment of a computer arrangement for players controlling a common display.

Once the instruction has been generated, it is packaged and transmitted (211) by the mobile device (105) and is sent to one of a number of interconnected and interrelated worker servers (201) that will be managing the data flow as best shown in FIG. 2B. Generally, each of these servers (201) will be assigned to interact with a certain number of mobile devices (105). When the instruction is received, it is processed and understood, the worker server (201) will then instruct a host server (301) to act on the instruction and alter the game field (401) on the display (401).

From a user's (103) point of view, they will be carrying out one action on their mobile device (105) while those around them are also carrying out similar (or different) actions. If the user (103) then watches the central display (401), they will see an avatar on the central display (401) reacting to the combined input of some or all the users (103) in the venue (10). This input will generally be in real-time (or near real-time) to the user (103) to add to realism. Thus, each user (103) is contributing to an avatar (403) and the game (401) but each user is not controlling their own avatar as is the case in a standard multi-player game. There are generally substantially fewer avatars than there are human participants in the present activities.

The distinction in avatar control from the present systems and methods to a multi-player game is an important one. In a multi-player game, the player has an individual avatar and they only know what to do with their individual avatar by looking at their individual display. That is, the display on their system shows them the interaction that is needed on their device to move their avatar where it needs to be. Thus, if the user sees on their display that their avatar needs to move forward and then turn right, they will move forward and then turn right when their individual display indicates that their avatar has reached the point where a right turn is necessary. In the present case, the player is looking at the communal display and will know that the avatar they are partially in control of needs to move forward and then to the right. They will then carry out actions on the individual device to assist in moving the avatar forward until they and everyone else controlling that avatar) see on the communal display that the avatar needs to now go right, and they will then change their input to move the avatar to the right.

In effect, a couple of important differences from the present systems to multi-player video games can be highlighted as follows: In the present systems and methods, an avatar is controlled by the joint actions of many human participants and there are generally far fewer avatars than there are participants. As such, there is no need for an individual user to be provided with a personal display for controlling their avatar as the loss of granularity in feedback is compensated by the loss of granularity in control. The community display can be used to show movement of the community controlled avatar. This arrangement allows for a dramatic reduction in the amount of computing power, and networking speed, needed for each player to play the game. Each player's mobile device (105) is reduced to a pure input object with local displays (107) being provided purely for instruction as to what commands to send (and are being sent), and the computationally difficult controls of actually moving the avatar, and providing graphics showing its actions, are offloaded onto the host server (301). This means that communications are generally one-way in the present systems and methods with data always flowing from the mobile device (105) to the host server (301) as opposed to needing to be two-way in a traditional multi-player video game. This reduces the network bandwidth necessary for each player to participate and allows the mobile device (105) to have a slower connection. Further, there is no need for any substantial computational activity to occur at the mobile device (105). The mobile device (105) does not need to generate a detailed display or update the display based on the actions of other players. Thus, the processing speed of the mobile device (105) can be less and there is no need to have installed software on the mobile device (105) that is used to generate the local display (107).

Figure 3:
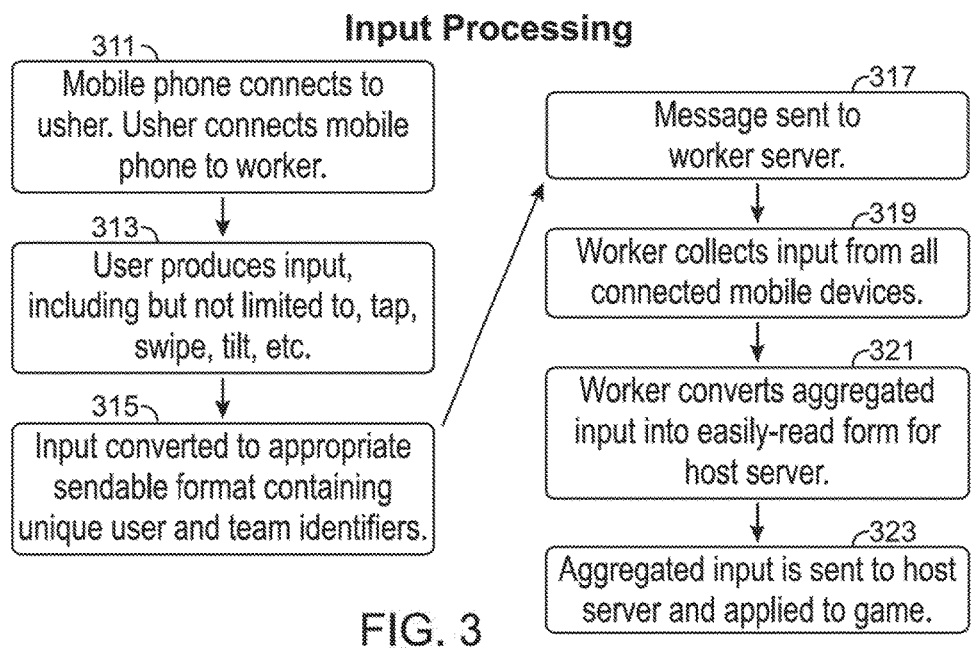
FIG. 3 provides a flowchart of an embodiment of data flow.

FIGS. 2A and 2B provides a block diagram of how an activity or game is initially setup (FIG. 2A) to connect the plurality of mobile devices (105) to the host server (301) that ultimately powers the activity and how the various inputs from the mobile devices (105) can be processed and transferred during an activity (FIG. 2B). FIG. 3 provides a general flowchart of steps of the data communication associated with the mobile device (105). Generally, communication during the activity will be one-directional as a user's mobile device (105) will be displaying a display (107) which is different from the central display (401) which is on the central screen (101) and does not receive input as to the display from the host server (301) after initial setup. This is however, not required, and the display (401) from the central screen (101) can alternatively or additionally be provided back to the user's device (105) during the game play. However, a one-directional methodology, where the mobile device (105) acts as a "controller" and the central display (401) acts as the display is generally preferred.

One-directional communication during game play by eliminating the need for the user's mobile device (105) to display (107) any information responsive to occurrences of other players can provide for a very large reduction in network traffic. For example, if there were n players where each of the n players need to know what the other n−1 are doing (as in a traditional multi-player video game) there would be a need to communicate n instructions for every action by every player (1 instruction into the host and n−1 instructions out to other players). Thus, assuming each player took one action in each time window, this would result in the communication of $n^2$ instructions (n into the host and n*(n−1) from the host to the individual mobile devices) in each time window. In a one-way communication, with a players each of which transmits one instruction in the same time window, there is only n communications necessary. It should be apparent that the exponential increase in communications as the number of players goes up in the two-way communications system will much more rapidly use up all available bandwidth in a network connection than will the linear increase in the one-way communication system. Thus, a large venue which can hold 50,000-100,000 people will only generate about as much one-way network traffic as 200-300 people would generate in two-way traffic, which is easily manageable with current server systems.

It should be recognized that while the communication will generally be one-way from the mobile device (105) to the worker server (201) during game play, in an embodiment, there may be two-way communication or communication from the worker server (201) to the worker server (201) before or after game play. For example, the worker server (201) may send information to verify the connection when the usher server (601) first makes the connection. Similarly, the worker server (201) may send a "thanks for playing" message back to the mobile device (105) at the conclusion of game play which may include information about that player's game play. The worker server (201) may also send information to sever the connection. The one-way communication generally takes place during the game play and is related to instructions useful for providing game data. These are not communicated from the worker server (201) to the mobile device (105). Thus, the mobile device (105) is not provided with any updates to game data during the game.

As shown in FIG. 3, game play will generally progress as follows. First the user (103) will connect to a worker server (201) in step (311). They generally will not install software on their machine to perform this connection, but will use standard infrastructure software and its inherent capabilities such as, but not limited to, a web browser to connect. The connection may occur using JavaScript™ or another scripting language for the software in this regard. The central display (401) may facilitate the setup by providing an indication an Internet address or similar direction for logging in. This can be using a typed in address, or by using various machine readable formats (e.g. QR or UPC codes) that a user can access using their mobile device (105) in the typical fashion. Software access is typically provided to their mobile device (105) via an open portal connection to the worker server (201) and the user's internal mobile device (105) software would solely to provide for initial setup, for the generally one-way communication during the game, and to internally provide feedback to the user as to their action. Software on the mobile device (105) will be used to interpret the instructions which the user (103) is giving to the mobile device (105) based on the rules of the game. For example, the mobile device (105) may determine how many swipes (and in which direction) the user is swiping the screen. Alternatively, the mobile device (105) may determine how violently it is being shaken (e.g. how far is it translating back and forth in any given time or how many directional changes of a certain given magnitude occur in any given time). The user (103) will now carry out game actions on their mobile device (105) once the game has started in step (313). Starting instructions will usually be given via the central display (401), but this is by no means required.

At certain set intervals, the number and details of these instructions will be gathered up and transmitted (211) from the user's mobile device (105) to the worker server (201) to which they are connected in step (315). The worker server (201) will have been previously selected for this mobile device (105) in step (311) prior to instructions being received. Generally, the venue (10) will have access to a number of servers (201) each of which is capable of connecting with a certain number of mobile devices (105) in any given time window. The worker servers (201) may be providing services solely to this venue (10) or may be providing services to a multitude of venues depending on embodiment. For example, the worker server (201) arrangement may comprise live separate servers located at the venue (10) or access to five servers at a central remote location each of which is handling multiple different venues (10). Each of the worker servers (201) may include its own specific Bluetooth or Wi Fi systems capable of interacting with corresponding systems in mobile devices (105) or may be connected to the Internet for receiving communication from that or another network to which the mobile devices (105) are uploading.

Once the software on the mobile device (105) has prepared and packaged the instruction (or more commonly multiple instructions) from this user it will send them (211) in step (317) to the worker server (201). The worker server (201) will receive this communication and will collect the instructions from multiple mobile devices in step (319). In an embodiment, the worker server (201) will collate the results from multiple devices (105) to obtain a total from the mobile devices (105) connected to that worker server (201) or may otherwise process the input into a single command in step (321). This command (213) is then passed on to the host server (301) in step (323), the host server (301) will then alter (215) the screen display (401) to comport with the instructions received.

It should be understood that the instructions from the mobile device (105) will generally want to be acted upon in real-time or near real-time so that the players (103) will see changes generally as the instructions are sent. This means that a very large number of instructions from a large number of mobile devices (105) will generally need to be processed quickly and provided to a single graphical controller. For example, in a modern stadium it is not surprising for there to be at least 30,000 and possibly upward of 100,000 attendees (101) at an event. If each of these individuals is participating in the game (401), and each can generate three or four instructions per second, it should be clear that the amount of data necessary to transmit can increase very quickly.

It is important to recognize that the nature of the game setup when a game is being performed in an arena is very different from a game where multiple users are logging in around the world. In a traditional multi-player video game, while a server could be handling the simultaneous interaction of hundreds of thousands or even millions of users, there will generally be a relatively constant, or at least slowly changing number of users starting and stopping the game. Further, regardless of how big the playing field is, any one user will often have interaction with only a relatively small number of users on the system at any time. To put this another way, traditional multiplayer games often work because the avatars each player "sees" on their display is actually only a very small subset of the avatars currently playing. This can be because their area of manipulation is limited, and also be manipulated by the game server. For example, two players may actually be in parallel universes or instances of the game. That is, the person may see only 12 other avatars, even though in that section of the game there are actually avatars for 12,000 users. The issue is that each player is simply seeing one of 1000 subsections of the users and the rest are being ignored.

In a game which is setup in a physical arena in a quick and often ad-hoc fashion during a time break in action of relatively short duration (often 5 minutes or less), however, this is not generally possible. Specifically, all the users in the arena (which will commonly be in the tens of thousands) will need to join the game within a short (e.g. measurable in seconds) period of time, they all need to be together in the same game and cannot be in parallel occurrences during the entire play, and then they will all relatively quickly need to quit the game. Further, all of the actions of players obtaining the game, accessing the game, playing the game, and leaving the game will need to take place during the break in action at the arena.

In the embodiment of FIG. 2B, the server systems are generally able to handle the users once they are logged into the game and connected. One concern, however, lies in getting them connected quickly when a large number of connection requests are coming in at once. To deal with this, the embodiment of FIG. 2B will commonly be setup using a special type of server computer called an usher server (601) as illustrated in FIG. 2A.

In FIG. 2A, when each mobile device (105) goes to the provided network location it will communicate (611) with an usher server (601). The usher server (601) is designed to quickly receive the communication (611) from the mobile device (105) and to connect (621) the mobile device (105) to the desired worker server (201). As such, the usher server (601) will generally not provide any game information. Instead, it may provide basic graphics information for the initial second display (107) setup as well as communication information to connect the mobile device (105) to the worker server (201). It is not surprising at this stage of setup if data transfer in communication (611) is substantially more two-way than it will be later in communication (621) to achieve the initial setup. Alternatively, the usher server (601) may also direct an information exchange (631) between the mobile device (105) and a storage server (701) which will act as a central repository to provide the information to the mobile device (105). The actions of the various servers (201), (601), and (701) may also be controlled by a central controller (801).

The worker server (201) allocated to any particular mobile device (105) may be based on a selection algorithm to make sure that the load across the servers (201) is generally balanced and the highest possible speed of communication (621) with all mobile devices (105) is maintained given the number of involved mobile devices (105) and servers (201) available or via any other method. As would be understood by one of ordinary skill in the art, any form of load balancing, known or later discovered, may be used to balance the mobile device (105) load across the worker servers (201) can be used. Further, any type of connection to the worker server (201) may be provided including initiating a direct connection between the worker server (201) and the mobile device (105) or a moderated connection placing the usher server (601) between.

The above allows the usher server (601) to rapidly process and pass off the large and quick influx of requests to join the game which occur at the very start. It can act to spread these requests across worker servers (201) and then move onto the next one. Once all the players from this game have been passed off, the usher server (601) then has capacity to take in the next influx which will usually be from a game occurring at a different venue. The usher computers (601) therefore act to level out the ebbs and flows of the inputs.

The above illustrates why the usher server (601) arrangement of FIG. 2A is preferred. This arrangement allows for the usher server (601) to handle little or none of the active gameplay but instead focus entirely on getting the mobile devices (105) setup and connected. Once the mobile devices (105) have gotten their initial information, the usher server (601) essentially is removed from the communication (621) with that mobile device (105) and the usher server (601) can go on to handle communication (611) with another mobile device (105). While human users will often measure their log-in time as a matter of multiple seconds (e.g. it will take users different amounts of time in seconds to make their access request), the usher server (601) can often perform all necessary actions to connect that mobile device (105) after the request is sent in real-time and sometimes in less than a second or a few seconds. This can provide real-time or near real-time setup even as an entire arena of people is essentially simultaneously requesting access.

The use of an usher server (601) can also provide for improved safety from malicious attacks on the systems herein. Only the location of the usher server (601) is generally visible and the worker server (201) can be at a hidden and generally unknown address. Further, the address of the usher server (601) may only be visible at the time log in is to occur. The most likely way that the game play system discussed herein would be attacked is through a denial of service (DoS) attack where a malicious user would attempt to put through a huge number of requests to hack up the worker server (201) and bait the ability to have game play. The usher server (601) system of FIG. 2A is more resistant to this than many standard systems because the usher server (601) is designed to handle a sudden increase in connection requests as that is the form expected, and because it can be harder to initiate and carry out such an attack when the game setup and activity is only ongoing for a relatively short period of time.

At the end of the action of FIG. 2A, the mobile devices (105) are generally connected to an appropriate worker server (201) as shown in FIG. 2B. To deal with the data influx from the plurality of mobile devices (105), the use of multiple worker servers (201) is generally preferred as discussed above as this allows for server balancing and improved speed. In addition, certain methods can be used to try and decrease the amount of data being transmitted. In an embodiment, the data can be consolidated at each stage of transmission. For example, if the data is for which direction a person is swiping, generally each individual attendee (101) will only be swiping in one direction. Therefore, it is not necessary to transmit each swipe as a different piece of information. Instead, the mobile device (105) may simply transmit (211) a total number of swipes in the specified direction at certain fixed time intervals (for example every second). As a mobile device (105) is generally able to process much faster than a user (103) can carry out any kind of gestural action and the sheer number of inputs into the game (401) can rapidly overwhelm a human's ability to pick out any one, such packaging can be virtually transparent to the user (103)

Worker servers (201) can similarly consolidate information from multiple devices (105) in the same way and transmit (213) the consolidated information to the host server (301). For example, the worker server (201) can collect the total number of swipes for each direction and send the totals. Alternatively, the worker server (201), if the nature of the game is accommodative, could cancel opposing instruction and send only the difference. For example, if 50 right swipes and 60 left swipes were received, the worker server (201) would send a net 10 swipes left to the host sever (301).

As shown in FIG. 2B, each mobile device (105) will generally transmit its information to the appropriate worker server (201) to which it is connected and the worker server (201) will transmit its information to the host server (301) which controls the actual game play. In this way, the host server (301) is actually receiving very few transmissions compared what is received by each worker server (201) and each worker server (201) is not having to process all the instructions from all the mobile devices (105). Thus, very large numbers of instructions can be handled very quickly. Further, as should be apparent in FIG. 2B, during game play, the communication (621) is generally only one-way (as opposed to during setup in FIG. 2A). Information is flowing from mobile devices (105) to the worker servers (201) and to the host servers (301) but not the other direction.

It should be recognized that during game play the second display (107) could be displaying game related data. However, the game related data is not being live updated during the game in the preferred embodiment. For example, the second display (107) on the mobile device (105) may show a target for the user to swipe at when doing their gestures. The mobile device (105) may, for example, move the target with every swipe and/or provide for a "slash" image across the touchscreen display with every swipe or may provide a static display. This information, however, is not actually game information. It is simply feedback to the user that they have swiped the screen. The feedback is not obtained from the worker server (201) is any way. It is simply performed internal to the mobile device (105). This will generally be the operation during game play so that the information flow is not constricted even with a large number of users.

The hot server (301) is responsible for controlling the content (401) of the end display (401). Generally, the host server (301) will be the standard system for controlling the display (401) and will simply be provided with appropriate software to display the game and interpret the input from the various worker servers (201). As the inputs on the mobile device (105) is often gestural, the software controlling the game on the host server (301) will often utilize a physics engine to provide for output and movement of game avatars. Alternatively, the controller (801) may actually handle all the game control and act to assist the host computer (301) or to even control the host computer (301). In such an embodiment, instructions may actually be provided to the controller (801) from the worker server (201) either additionally or instead of to the host computer (301).

It should be recognized that in certain situations, the host server (301) may mid to manipulate the game and make sure that the game runs for the appropriate amount of time. For example, a timeout in sports generally allows the team to be off the field for only a particular amount of time and play needs to resume after that time is done or else one team may get an unfair advantage in their time outs compared to the other. To deal with the fact that the activity provided herein needs to be completed within this fixed amount of time the software on the host server (301) may provide some manipulations to the activity to make sure that the activity progresses as it needs to. For example, the software may weigh the value of any one instruction based on the total number of instructions or players. For example, assume an avatar needs to move 6,000,000 units to complete its trip and have the game end and the game needs to take no more than 60 seconds. Also let us assume there are 10,000 players that will each provide 3 instructions per second. In this case the host server (301) may provide that each instruction will result in moving the avatar 4 units. In this case, the instructions provided will move the avatar 7,200,000 units in exactly 60 seconds which should allow the game to complete in time (even with some inaccuracy and variability in players providing input). If the number of players doubled, the host server (301) would instead assign that each instruction would move the avatar 2 units. This would result in the same amount of avatar movement in the same time. This sealing of avatar movement based on the number of users and their behavior can provide for an activity of more definitive length by generally forcing the game last within a desired window of time.

Should there be a problem starting to arise that an activity may not complete in time, a user in charge of the host server (301) may be provided with a master override which will supplement the actions of the user. For example, such "super user" may be provided with the ability to enter multiple instructions with each instruction given. For example, a super user may be able to enter 3,000 instructions for every instruction they enter. This super user would thus be able to close to double (or virtually contradict) the actions of the entire rest of the users. While the super user ability is desirable as it provides for a measure of additional protection that the activity does not run too long or to short, it is generally important that it not detract from the actual effects the audience is seeing, and that its use generally not be noticeable. In this respect, the selection of the super user's multiplier effect of instructions will generally be such that while it can act to speed up or slow down the outcome of the game, it generally would not be able to alter it except in very close cases. In this way, a super user's interference with the game will generally not detrimentally effect play, or be particularly noticeable, but can allow for acceleration or the activity as necessary.

It should be recognized that the end display (401) can provide a wide variety of content (401). In most embodiments, the content (401) will generally be indicative of a contest in the form of a game or a collaborative exercise, but these are not intended to be limiting. This is a logical arrangement as it allows the attendees (101) to pick, or be assigned, a side as part of participation, and to then play by supporting that side or for every player to play as one "team" with a common goal. The game may be based on the nature of the event being attended, or may be unrelated, FIGS. 4-7 provide for embodiments of a competitive game (401) while FIG. 1 shows a collaborative activity (401).

FIG. 8 shows a screen (801) which may comprise the content (107) for selecting a team if user selection of a team is a provided functionality. This screen (801) will generally be displayed on the display (101) during setup. The user (101) could be able to tap on the team on their mobile device (105) secondary display (107) they wish to join or may be randomly or otherwise assigned to a team outside of their control (for example, it may occur by where they are sitting) as opposed to trying to navigate their particular device to select content on the display (401). Such setup content to the mobile device (105) can be provided via the usher server (601) and can be involved in worker server (201) selection for that mobile device (105).

Once the user has selected (or been assigned) a team, the secondary display (107) will generally provide for instructions on how to play the game. Generally, it will be preferred that the local display (107) be simple and not involve getting data from the worker server (201) to improve speed of the game transmission. In this way, the data transmission is one way with the mobile device (105) acting as a form of controller to the central display (401).

Figure 4:
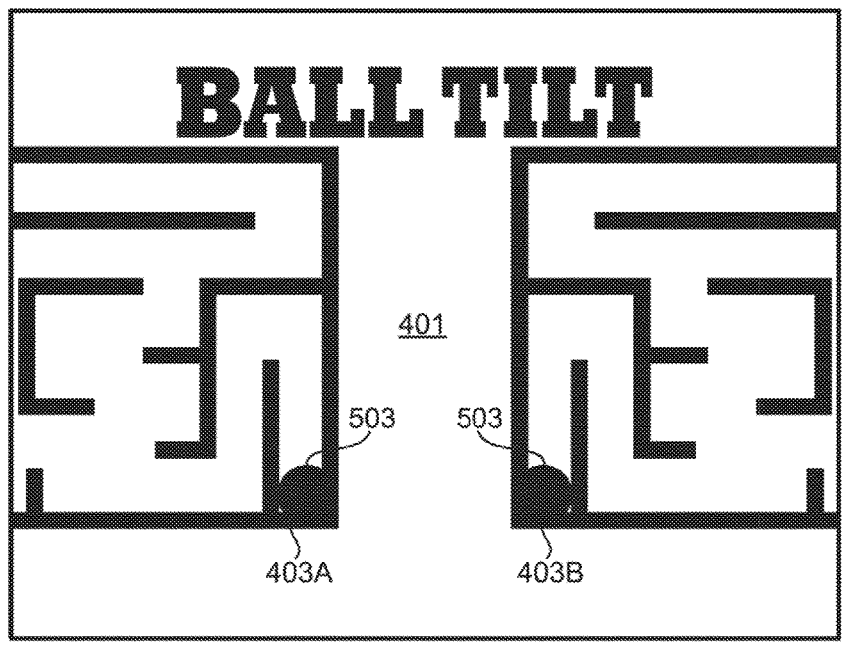
FIGS. 4-7 show screenshots of various common displays from multiple game embodiments.
Figure 5:
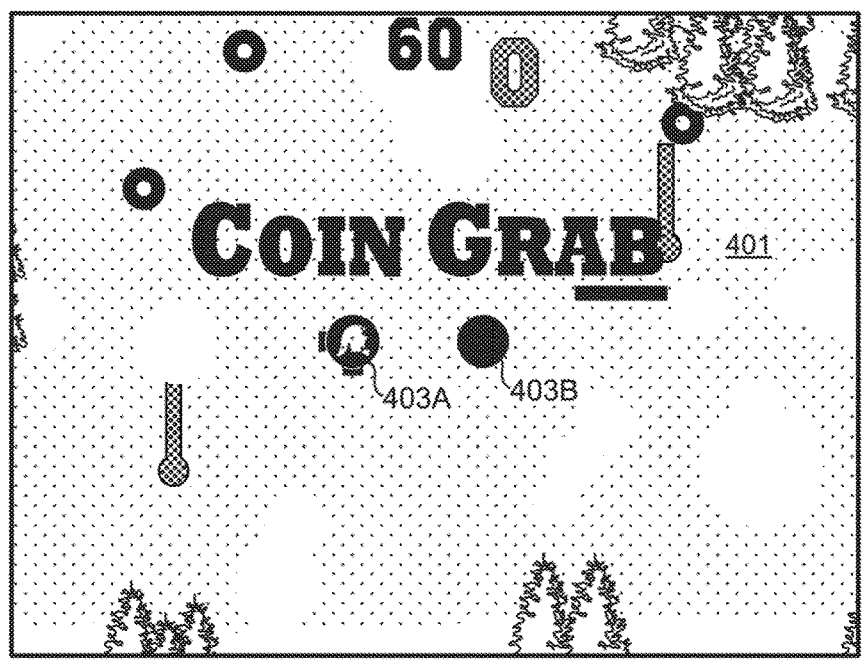
Figure 6:
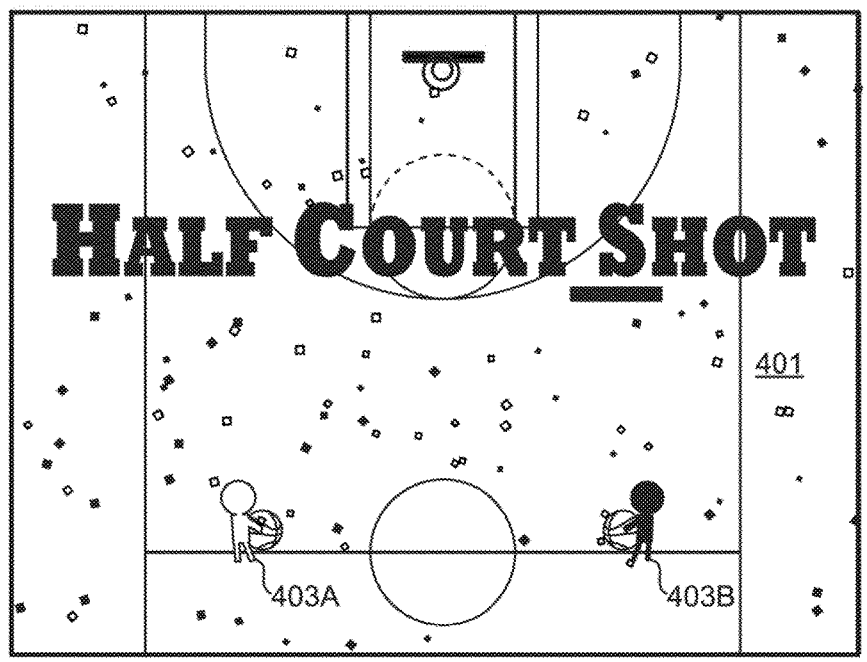
Figure 7:
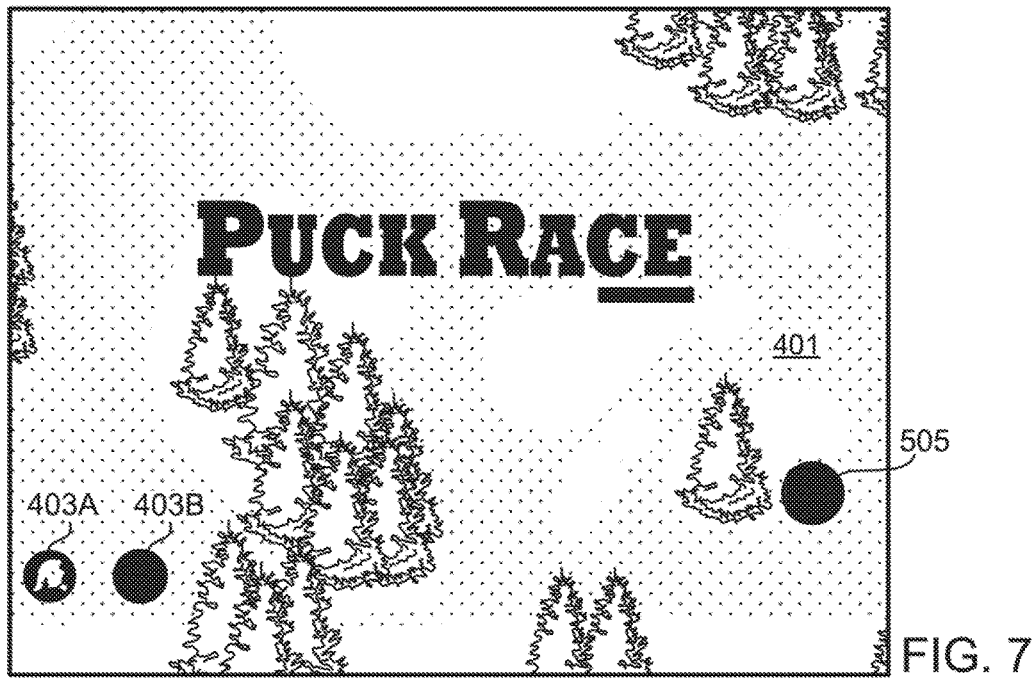

FIGS. 4-7 provide for a variety of game content (401) to display on the central display (401). It should be recognized that a variety of games are possible and these FIGS are only exemplary. FIG. 4 shows a competitive ball race game. In this game, the two teams will try to tilt their individual mobile devices (101) so that the maze avatar (403) tilts and the "ball" (503) "rolls" through the maze faster than it does for the opposing, side. In FIG. 5 each team avatar (403) comprises a collector which may be used to grab coins that are falling or otherwise presented on the screen by moving into them. In FIG. 6 each avatar (403) is a representation of a basketball player that will shoot a half-court shot based on user (103) input. Finally, in FIG. 7, the avatars (403) are designed to race through a maze like structure to be the first to reach a target (505).

It should also be recognized that the display (401) does not need to operate alone providing feed hack to the user (103). The system can operate the central display (401) in conjunction with other sensory apparatus. For example, the display (401) could be encouraging people to shake their phones (105) to get a volcano to explode. As the amount of shaking increases, the volcano display could begin to shake while simultaneously rumbling audio is getting louder corresponding to the imagery on the display (401). Lights in the stadium could also flicker and dim, or when sufficient game input is received, fireworks may be launched.

It should be recognized that while the invention is discussed herein in conjunction with a central display (401) for a large number of users (103) at a venue (10) interacting with mobile devices (105) this is not required. In an alternative embodiment, the users (103) could be at remote locations and could be interacting with a central display (401) using any other type of computer. Further, the content (401) of the central display (401) may be provided to them in any fashion such as via video if they are watching the event on television or via audio or text if they are interacting with the event via other remote activities.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A multi-player computer gaming system comprising:
    a venue having a central display visible to a plurality of users, each of said plurality of users having a mobile device;
    a host server controlling said central display;
    a plurality of worker servers in communication with said host server;
    an usher server for connecting a subset of said mobile devices to each of said worker servers;
    wherein, said central display provides an indication of how to make a connection using said mobile device;
    wherein said connection connects said mobile device to said usher server;
    wherein said usher server connects said mobile device to one of said worker servers;
    wherein each said mobile device provides an instruction to said connected worker server to control a portion of said computer game;
    wherein said connected worker server collects said instructions from said connected mobile devices and provides said instructions to said host server;
    wherein said host server alters said display based on said instructions; and
    wherein neither said host server nor said worker server sends instructions to said mobile device to alter a display on said mobile device.

2. The system of claim 1 wherein said venue is a sports arena.

3. The system of claim 1 wherein said venue is a concert hall.

4. The system of claim 1 wherein said mobile device is a smartphone.

5. The system of claim 1 wherein said central display provides a game being played by said users, said central display including an avatar.

6. The system of claim 5 wherein said central display includes a plurality of avatars, and said plurality of avatars is less than said plurality of users.

7. The system of claim 1 wherein said mobile devices are separated into two or more opposing teams.

8. The system of claim 1 wherein said display on said mobile device changes solely on user input to said mobile device while said mobile device is communicating to said worker server.

9. The system of claim 1 wherein said display on said mobile device is static while said mobile device is communicating to said worker server.

10. The system of claim 1 wherein when each said mobile device provides an instruction to said connected worker server said instruction is sent directly from said mobile device to said connected worker server and does not pass through said usher server.

11. A method of providing a multi-player computer game, the method comprising:
    providing a venue having a central display visible to a plurality of users, each of said plurality of users having a mobile device;
    having said central display provide an indication of how to make a connection using said mobile device;
    connecting said mobile device to an usher server;
    said usher server connecting said mobile device to a worker server;
    each of said mobile devices providing an instruction to said connected worker server to control a portion of said computer game;
    said connected worker server collecting said instructions from said connected mobile devices and providing said instructions to said host server;
    said host server altering said display based on said instructions; and
    neither said host server nor said worker server sending instructions to said mobile device to alter a display on said mobile device.

12. The method of claim 11 wherein said venue is a sports arena.

13. The method of claim 11 wherein said venue is a concert hall.

14. The method of claim 11 wherein said mobile device is a smartphone.

15. The method of claim 11 wherein said central display provides a game being played by said users, said central display including an avatar.

16. The method of claim 15 wherein said central display includes a plurality of avatars, and said plurality of avatars is less than said plurality of users.

17. The method of claim 11 wherein said mobile devices are separated into two or more opposing teams.

18. The method of claim 11 further comprising, changing said display on each of said mobile devices, said changing occurring based solely on user input to said mobile device while said mobile device is communicating to said worker server.

19. The method of claim 11 wherein said display on said mobile device is static while said mobile device is communicating to said worker server.

20. The method of claim 11 wherein when each said mobile device provides an instruction to said connected worker server said instruction is sent directly from said mobile device to said connected worker server and does not pass through said usher server.

\* \* \* \* \*